US005673070A

United States Patent [19]
Nakanishi et al.

[11] Patent Number: 5,673,070
[45] Date of Patent: Sep. 30, 1997

[54] RECORDING APPARATUS FOR CONTROLLING RECORDING IN ACCORDANCE WITH BATTERY CAPACITY

[75] Inventors: Hideki Nakanishi, Tokyo; Junichi Arakawa, Yokohama; Hideo Horigome, Tokyo; Yuichi Kaneko, Yokohama; Tetsuhito Ikeda; Akira Kuribayashi, both of Kawasaki, all of Japan

[73] Assignee: Canon Kabushiki Kaisha, Tokyo, Japan

[21] Appl. No.: 171,165

[22] Filed: Dec. 22, 1993

[30] Foreign Application Priority Data

Dec. 28, 1992 [JP] Japan ................... 4-348688

[51] Int. Cl.$^6$ ........................ B41J 2/00
[52] U.S. Cl. ........................ 347/19
[58] Field of Search .............. 347/19, 109, 180, 347/192, 14, 12, 13, 181, 182

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 5,053,790 | 10/1991 | Stephenson et al. | 347/192 |
| 5,182,583 | 1/1993 | Horigome et al. | 347/19 |
| 5,353,043 | 10/1994 | Akiyama | 347/181 |

FOREIGN PATENT DOCUMENTS

| | | |
|---|---|---|
| 0390444 | 10/1990 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 62-130861 | 6/1987 | Japan . |
| 1066580 | 3/1989 | Japan . |
| 5000530 | 1/1993 | Japan . |

OTHER PUBLICATIONS

Masahiko, et al., Abstract of Japanese Laid-Open Patent Application No. 5-112027, May 1993.

Primary Examiner—Benjamin R. Fuller
Assistant Examiner—Craig A. Hallacher
Attorney, Agent, or Firm—Fitzpatrick, Cella, Harper & Scinto

[57] ABSTRACT

A battery-driven recording apparatus records a plurality of lines by recording-scan by using a recording head having a plurality of recording elements. A capacity of a battery is detected, and when the capacity of the battery is lowered, the number of lines to be recorded in one recording scan is reduced.

5 Claims, 6 Drawing Sheets

RECORDING APPARATUS FOR CONTROLLING RECORDING IN ACCORDANCE WITH BATTERY CAPACITY

BACKGROUND OF THE INVENTION

1. Field of the Invention

The present invention relates to a recording apparatus which is driven by a battery power supply.

2. Related Background Art

In a recording apparatus such as a printer or a facsimile machine, an energy generator for a recording head is driven in accordance with transferred image information to record an image of dot pattern on a record sheet such as a paper or a plastic sheet. Such a recording apparatus may be classified into an ink jet type, a wire dot type and a thermal type.

In such a recording apparatus, a commercial power line is usually used as a main power supply, but in a portable small size apparatus, a two power supply system by an AC adaptor and a battery may be adopted. When the recording apparatus is driven by the battery, it is difficult to drive respective units of the apparatus when a remaining capacity of the battery reduces and an output voltage of the battery drops. For example, if the battery voltage drops during a recording operation and the print function is stopped, the recording information so far received is lost. In case of the ink jet recording apparatus, an ink discharge orifice of a recording head may not be closed by a cap member and a nozzle of an ink jet head may be clogged because the ink is dried.

Accordingly, when the recording apparatus, particularly, the ink jet recording apparatus is to be driven by the battery, it is necessary to monitor the capacity of the power supply battery and take an action when the battery capacity decreases below a predetermined level.

In order to detect the shortage of the battery capacity used in the recording apparatus as an internal power supply, the following method is usually used. For example, when the apparatus is in printing, a load varies with a load and a terminal voltage of the battery to time changes as shown by a graph of FIG. 6. The capacity of the battery is detected by monitoring a differential voltage (hereinafter $V_1$) (3) which is a battery open voltage (hereinafter $V_0$) (1) minus a maximum voltage drop (hereinafter $V_d$) (2) due to a change of load. When $V_1$ reaches a reference (hereinafter $V_T$) (4), the recording apparatus detects the shortage of the battery capacity. The comparison of $V_1$ and $V_T$ may be done by (1) applying $V_1$ to an A/D converter and comparing an output thereof with $V_T$, or (2) comparing $V_1$ and $V_T$ by a comparator circuit.

In order to increase a print speed of such a recording apparatus, a recording head 7 having a plurality of recording elements 6 arranged thereon may be used as shown in FIG. 7. A single recording element can print only one line at a time but a plurality of lines may be simultaneously printed by arranging a plurality of such elements as shown in FIG. 7.

In the past, when the recording apparatus of such a construction detects the shortage of the battery capacity, the printing is terminated at that moment. When a user of the recording apparatus wants to continue the printing, the user must reload a battery having a sufficient capacity to the apparatus or connect an external power supply such as an AC adaptor to get an electromotive force.

However, when a plurality of lines are to be simultaneously printed, a power consumed during the drive of the apparatus is larger than that consumed when the printing is done line by line in a conventional manner.

Thus, when the apparatus is to be driven by the battery, the printing is terminated relatively earlier in order to prevent malfunction by the drop of the battery voltage.

Accordingly, the following shortcomings are encountered.

(1) The printing is terminated before the capacity of the battery is fully exhausted.

(2) Where a secondary battery is used, a memory effect may take place if the charge and discharge are repeated in the form of (1).

SUMMARY OF THE INVENTION

It is an object of the present invention to provide an recording apparatus in the light of the above problems.

It is another object of the present invention to provide a battery-driven recording apparatus which can print while efficiently using a battery.

It is a still another object of the present invention to provide a recording apparatus which changes a volume of data to be recorded in one record scan in accordance with a capacity of a battery to effect the printing while efficiently using the battery.

It is a still another object of the present invention to provide a recording apparatus which detects a capacity of a battery and changes the number of recording elements to be used in the record scan in accordance with a result of detection.

The above and other objects of the present invention will be apparent from the drawings and the following description.

DETAILED DESCRIPTION OF THE PREFERRED EMBODIMENTS

The preferred embodiments of the present invention are now explained with reference to the accompanying drawings.

Figure 1:
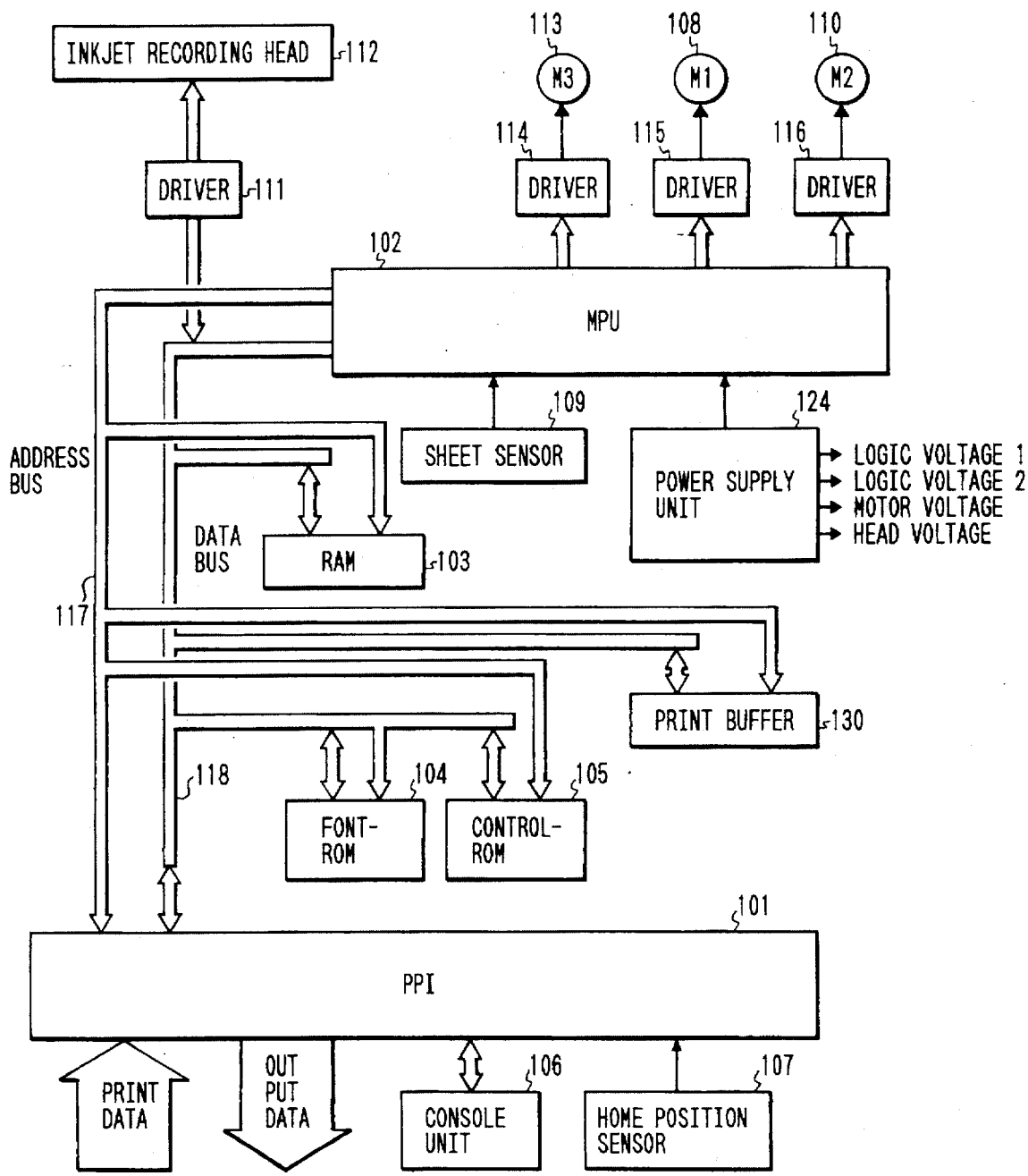
FIG. 1 shows a block diagram of a main part an ink jet printer in accordance with the present invention.

FIG. 1 shows a block diagram of a main part of an ink jet printer in accordance with an embodiment of the present invention. While the ink jet printer is described in the present embodiment, it should be understood that the present invention is not limited thereto but is also applicable to other recording apparatuses such as a printer using other recording methods, a word processor or a facsimile machine.

In FIG. 1, numeral 101 denotes a programmable peripheral interface (hereinafter PPI) which receives a command signal and a record information signal sent from a host computer, not shown, transfers it to an MPU 102, controls a console 106 and receives a signal from a home position sensor 107 which detects when a carriage is at a home position. The MPU (microprocessing unit) 102 controls respective units in the ink jet printer in accordance with a control program stored in a control ROM 105. Numeral 103 denotes a RAM which stores received signals and is used as a work area for the MPU 102 to temporarily store various data. Numeral 104 denotes a font generation ROM which stores pattern information of characters and records for code information and outputs pattern information in response to input code information. Numeral 130 denotes a print buffer memory which stores data developed by the ROM 104 and has m lines of capacity. Numeral 105 denotes a control ROM which stores processes (FIGS. 3–4) to be executed by the MPU 2. Those units are controlled by the MPU 102 through an address bus 117 and a data bus 118.

Numeral 108 denotes a carriage motor which drives a carriage on which a recording head 112 is mounted to attain reciprocal scan. Numeral 110 denotes a sheet feed motor for feeding a recording medium such as a paper sheet vertically to a direction of drive of the carriage, and numeral 113 denotes a capping motor which drives a cap member to abut it against an ink discharge orifice (not shown) of the recording head 112 to be described later to isolate the ink discharge orifice from an external atmosphere in order to prevent the drying of the nozzle. Numeral 115 denotes a motor driver for driving the sheet feed motor 110 and numeral 114 denotes a motor driver for driving the capping motor 113. A console 106 is provided with keyboard switches and indication lamps. The home position sensor 107 is arranged in the vicinity of the home position of the carriage and detects when the carriage on which the recording head 112 is mounted reaches the home position.

Numeral 109 denotes a sheet sensor which detects the presence or absence of a recording medium such as record sheet, that is, whether it has been fed to a recording unit or not. Numeral 112 denotes an ink jet recording head which discharges an ink droplet by causing a state change by film boiling by using thermal energy. The recording head 112 is provided with m (for example 64) discharge orifices (not shown) and m discharge heaters (not shown) one for each discharge orifice. Numeral 111 denotes a driver for driving the discharge heaters of the recording head 112 in accordance with a record information signal. Numeral 124 denotes a power supply for supplying a power to the respective units. It has an AC adaptor and a battery as a driving power supply.

The MPU 2 is connected to a host system such as a computer through the PPI 101 and controls the record operation in accordance with a command and a record information signal sent from the host system, the processes of the program stored in the control ROM 105 and the record information stored in the RAM 103.

Figure 2:
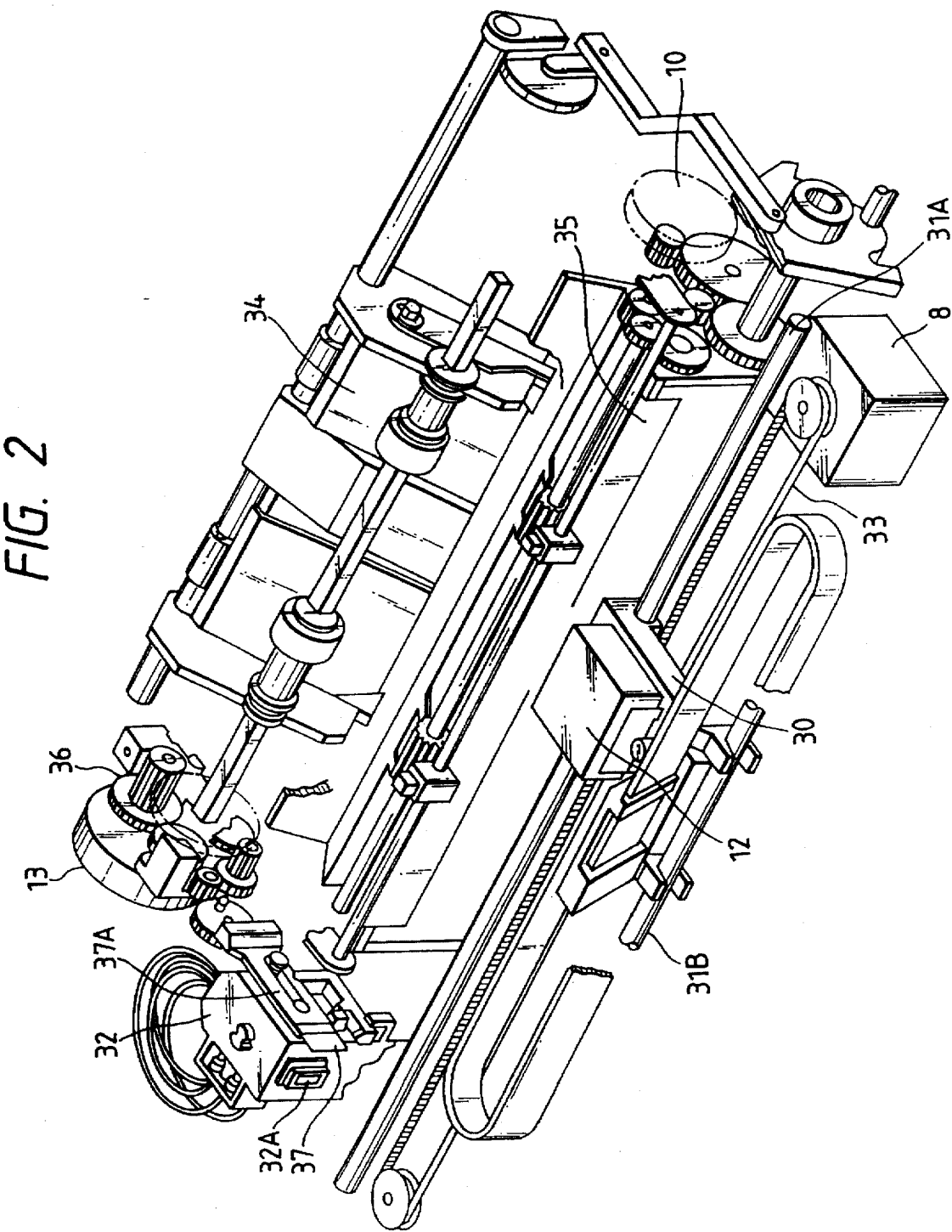
FIG. 2 shows a construction of a recording unit of the ink jet recording apparatus shown in FIG. 1.

FIG. 2 shows a perspective view of a print unit of the ink jet printer apparatus of the present embodiment. An ink jet printer head 12 is mounted on a carriage 30 integrally with an ink jet cartridge which is removable from the carriage 30. More than one ink jet cartridge may be provided depending on the inks used for printing. The head 12 is provided with an ink tank and an ink sensor which are not shown. A discharge signal for the print data from a data supply source is supplied to the print head 12 through a driver 11, a cable and terminals connected thereto.

The carriage 30 is coupled to a portion of a drive belt 33 which transmits a drive force of a carriage motor 8 and it is slidable on two guide shafts 31A and 31B arranged in parallel to each other so that the print head 12 may be reciprocally moved over the entire width of the recording medium. The relative movement between the carriage 30 and the recording medium is controlled by the print signal so that a desired image is printed on a record plane of the recording sheet fed from a sheet feed unit 34 onto a platen 35.

Numeral 32 denotes a head recovery unit which is arranged at one end of the path of movement of the print head 12, for example, a position facing the home position. The head recovery unit 32 is operated by a drive force of a capping motor 13 through a transmission mechanism 36 to cap the print head 12. In association with the capping of the print head 12 by a cap unit 32A of the recovery unit 32, ink is sucked by appropriate suction means provided in the head recovery means 32 or ink is supplied under pressure by appropriate pressure means provided in an ink supply path to the print head 12 so that the ink is forcibly ejected from the ink discharge port to recover the discharge operation such as by removing viscous ink in the ink path. At the end of printing, the ink jet print head 12 is capped to protect the print head 12.

Numeral 37 denotes a plate arranged on a side of the recovery unit 32 to function as a wiping member made of silicone rubber. The plate 37 is held by a plate holding member 37A in a cantilever fashion and it is operated by the capping motor 13 and the transmission mechanism 36 as is the head recovery unit 32 so that it is engaged with the discharge plane of the print head 12. In this manner, a blade 37 is projected into the path of movement of the print head 12 at an appropriate timing during the print operation of the print head 12 or after the recovery of discharge by the head recovery unit 32 so that dew drops, wetness or dust on the discharge surface of the print head 12 are wiped off as the print head 12 is moved.

Detail of the power supply unit 124 is now explained with reference to a block diagram of FIG. 3.

Figure 3:
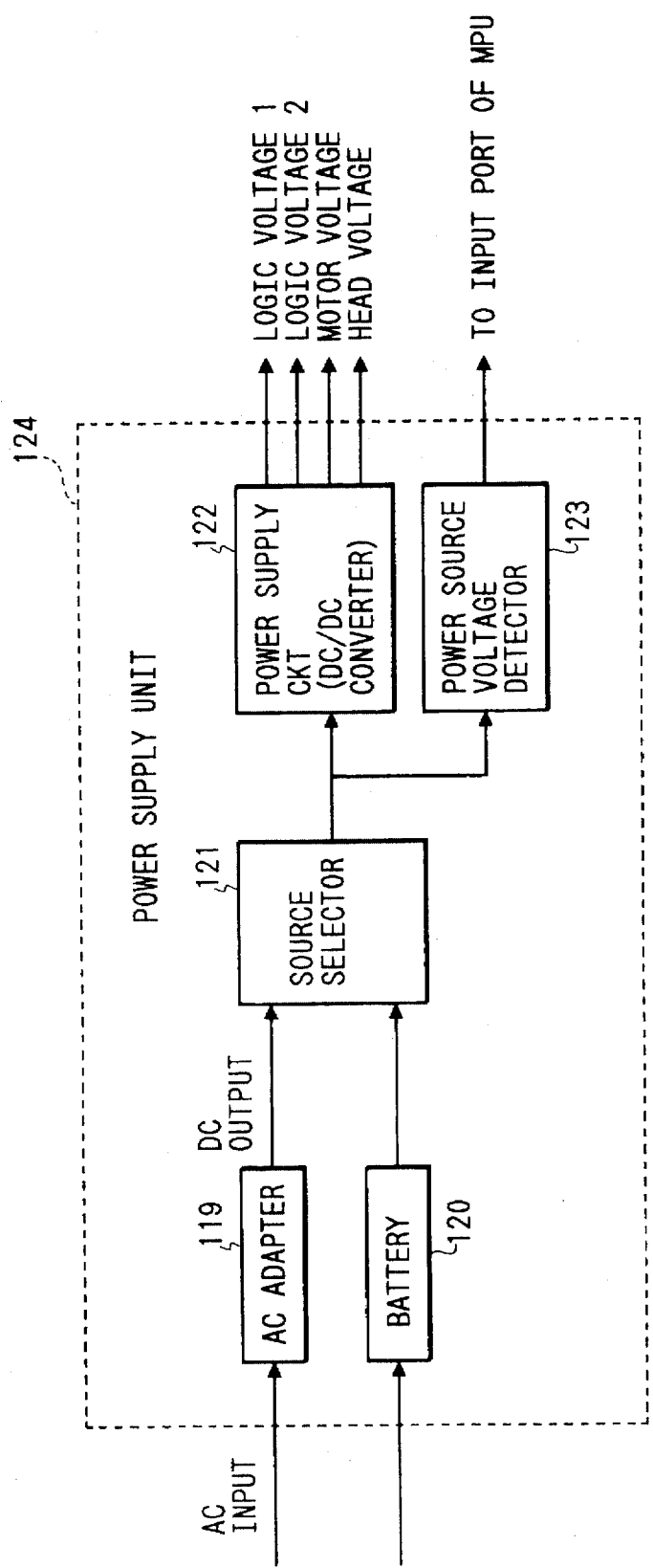
FIG. 3 shows a block diagram of detail of a power supply unit of FIG. 1.

In FIG. 3, numerals 119 and 120 denote driving power supplies of the ink jet recording apparatus, which are an AC adaptor and a battery, respectively. Numeral 121 denotes a source selector for selecting one of the two driving power supplies. It may be a power supply jack. Numeral 123 denotes a power supply voltage detection circuit for detecting an output voltage of the driving power supply and sending an output signal to an input port of the MPU 102. In the present embodiment, the voltage is divided by resistors, the divided voltage is A/D converted and it is supplied to the MPU 2. Alternatively, a comparator may be used.

Numeral 122 denotes a power supply circuit for converting a DC output from the driving power supply to a voltage suitable to drive the respective units of the ink jet recording apparatus. A logic voltage 1 is supplied to the MPU 2 to supply a voltage even in a power-off mode. A logic voltage 2 is supplied to a logic unit other than the MPU 2 such as the RAM 103, a motor voltage is supplied to the motors 108, 110 and 113 and a head voltage is supplied to the recording head 112. Those voltages are supplied only in a power on mode (record stand-by mode and record mode).

In the ink jet recording apparatus of the present embodiment, the record operation is controlled in accordance with the result of detection of the battery capacity. The control operation is now explained.

(Embodiment 1)

Figure 4:
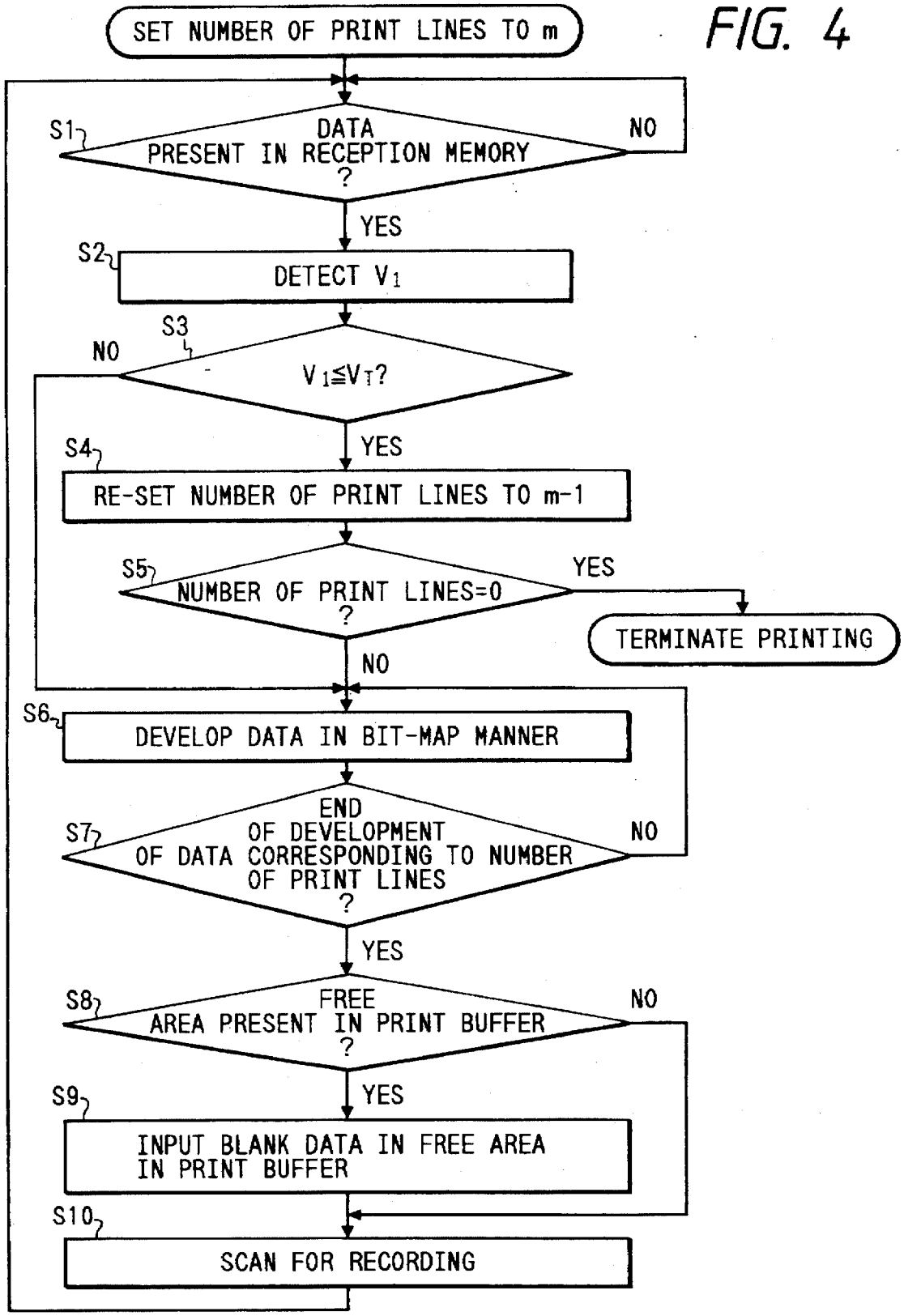
FIG. 4 shows a flow chart of a control flow in a first embodiment of the present invention.

FIG. 4 shows a flow chart of a control flow in a first embodiment of the present invention.

The recording apparatus is initially set to simultaneously print a plurality (m) of lines by the recording elements. When the printing is started, the apparatus first waits for print data. Namely, control to the next step is done only when the print data from the host is stored in the RAM 103 used as a receiving memory (decision in a step 1). Then, $V_1$ is detected (step 2), and it is compared with $V_T$ (decision in a step 3). If $V_1$ is larger than $V_T$, the print data stored in the RAM 103 is read out and analyzed and it is developed into a bit map by using the ROM 104 (step 6). The developed data is temporarily stored in the m-line print buffer 130 and the bit map development is continued until as many data as the number of lines to be printed is stored in the buffer 130 (step 7). When it is completed, the m-line simultaneous recording scan is effected (step 10).

However, when $V_1$ is lower than $V_T$ and the battery capacity reduces, the following control operation takes place (step 4).

A volume of print data to be developed into the bit map is reduced by one line per recording scan.

As the volume of data to be developed is reduced, a vacant area is produced in the print buffer (step 8). Bit map data to print blanks in all of the vacant area is supplied (step 9). By this control, the number of lines to be printed in one scan of the recording elements is reduced by one line and the power consumption of the apparatus is reduced accordingly. The above operation is repeated to print the data (steps 1 to 10).

If the number of lines to be printed in one recording scan reaches zero in the step 4 (step 5), the printing is terminated.

In this manner, when the battery capacity is lowered, the apparatus automatically reduces the load to suppress the power consumption to enable the printing in the low battery capacity range.

In the present embodiment, the number of lines to be recorded is reduced when the battery capacity is lowered. Alternatively, the number of columns may be reduced or the printing dots may be thinned in a checker flag (or zig-zag) pattern.

(Embodiment 2)

Figure 5:
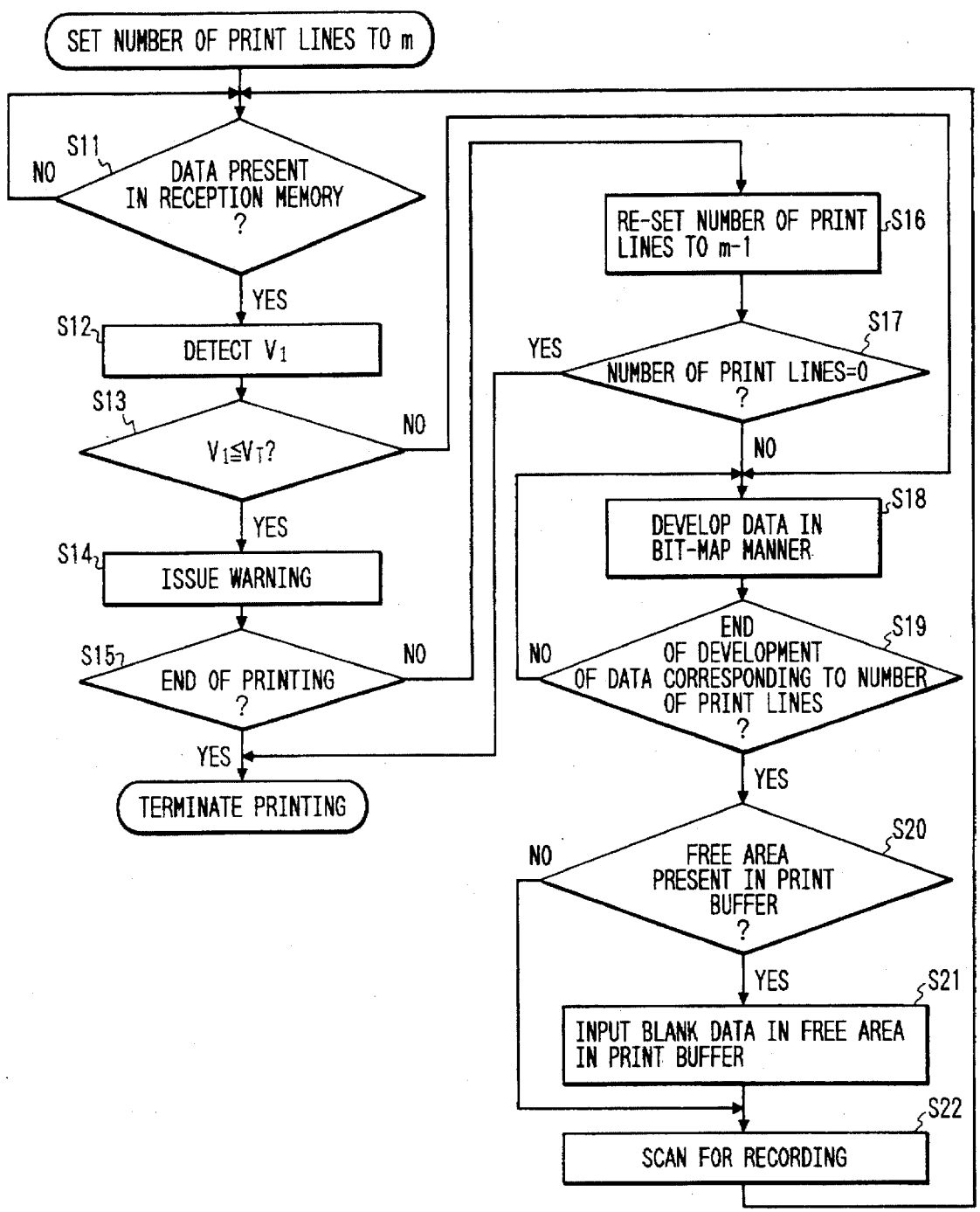
FIG. 5 shows a flow chart of a control flow in a second embodiment of the present invention.
Figure 6:
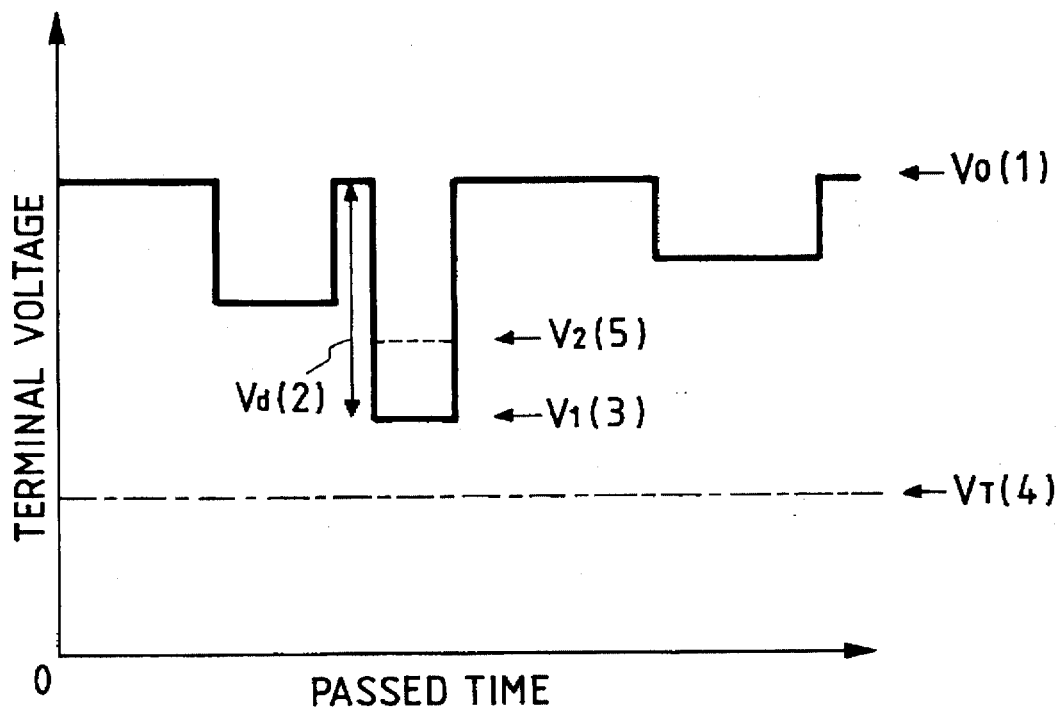
FIG. 6 shows a change of a terminal voltage of a battery during a recording operation.
Figure 7:
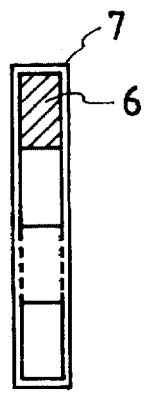
FIG. 7 shows a recording head having a plurality of recording elements.

Referring to FIG. 5, a control flow in a second embodiment of the present invention is explained. The recording apparatus is initially set to simultaneously print a plurality of lines by the printing elements. After the printing is started, steps 11 to 13 and steps 18 to 22 are identical to the steps 1 to 3 and the steps 6 to 10 of the embodiment 1 and the explanation thereof is omitted. In a step 13, if $V_1$ is lower than $V_T$, the MPU 102 issues an alarm signal to actuate an LED or a buzzer in the console 106 to inform that the printing cannot be continued because of the shortage of the battery capacity (step 14). Thereafter, a user determines whether to continue the printing or not (step 15), and if the user wants to continue, the user manipulates keys in the console 106 to continue the printing with one line less printing per scan. The MPU 102 detects the command and changes the setting of the number of lines to be printed in one recording scan (step 16) and resumes the activation of the apparatus.

The steps 11 to 22 are repeated.

In the step 15, if the user determines the termination of the printing, or if the number of lines to be printed in one scan cannot be reduced in the step 17, the printing is terminated.

As described above, by changing the number of lines to be printed in one recording scan in accordance with the battery capacity, the battery may be efficiently used.

In addition to the above advantages, the following advantages are further offered.

(1) When a secondary battery is used, a memory effect is prevented.
(2) The long time interruption of the printing by the replacement of a new battery or the connection of the external power supply by the user is prevented.

In the present embodiment, the recording apparatus of the ink jet recording type which has the means for generating thermal energy as an energy to be used for discharging the ink (for example, an electro-thermal transducer or a laser beam) and causes the status change in the ink by the thermal energy has been described. The high density and fine printing is attained by such an apparatus.

Typical construction and principle thereof are preferably those disclosed in U.S. Pat. Nos. 4,723,129 and 4,740,796. It is applicable to either an on-demand type or a continuous type. In case of the on-demand type, at least one drive signal for causing rapid temperature rise beyond nucleate boiling in accordance with the record information is applied to an electro-thermal transducer arranged for a sheet which holds liquid (ink) or a liquid path so that a thermal energy is generated in the electro-thermal transducer and bubbles are formed in the liquid (ink) which corresponds to the drive signal. The liquid (ink) is discharged through a discharge port by the growth and contraction of the bubble to form at least one droplet. When the drive signal is pulsive, the growth and contraction of the bubble are instantly and properly effected and the highly responsive discharge of the liquid (ink) is attained. The pulsive drive signal is preferably one disclosed in U.S. Pat. Nos. 4,463,359 and 4,345,262. When the condition described in U.S. Pat. No. 4,313,124 relating to the temperature rise on the thermal action plane is adopted, improved recording is attained.

The recording head may be a combination (linear liquid path or transverse liquid path) of the discharge port, the liquid path and the electro-thermal transducer, as disclosed in the above-mentioned patents, or those disclosed in U.S. Pat. Nos. 4,558,333 and 4,459,600.

In addition, a construction disclosed in Japanese Laid-Open Patent Application No. 59-123670 in which a slit common to a plurality of electro-thermal transducers is used as a discharge port of the electro-thermal transducers, or Japanese Laid-Open Patent Application No. 59-138461 in which an opening for absorbing a pressure wave of thermal energy is provided for the discharge port may be used, because the present invention allows the positive and efficient recording whatever the configuration of the recording head is.

Further, the present invention is also applicable to a full line type recording head having a length corresponding to a maximum recording medium width which the recording apparatus can record. Such a recording head may meet the length requirement by a combination of a plurality of recording heads or it may be a single integrally formed recording head.

In addition, the present invention is also effective to a serial type head described above as well as a recording head fixed to the apparatus, a replaceable chip type recording head which permits electrical connection with the main unit of the apparatus and the supply of ink from the main unit of the apparatus, and a cartridge type recording head having an ink tank integrally mounted on the recording head.

The addition of the recovery means and auxiliary means to the recording head is preferable as it further stabilizes the effect of the present invention. Specifically, they are capping means for the recording head, cleaning means, pressure or suction means, preheating means including an electrothermal transducer, a separate heating element or a combination thereof, and preliminary discharge means for effecting discharge other than for recording.

As to the type and the number of recording heads mounted, only one head per single color of ink may be provided or a plurality of heads may be provided for a plurality of inks of different colors or densities. Namely, the recording mode of the recording apparatus is not limited to one based on a primary color such as black but the present invention is also applicable to an apparatus having at least one of full color record modes by a plurality of different colors or mixed colors with an integral recording head or a combination of a plurality of recording heads.

In the present embodiment, the ink is used as the liquid. The ink may solidify at or below a room temperature or it may be softened at a room temperature or may be liquid. In the ink jet system, the ink which is of liquid phase when the record signal is applied may be used because it is common to control the ink within a range of 30° C. to 70° C. to keep the viscosity of the ink within a stable discharge range. In addition, the temperature rise by the thermal energy may be used as the energy of the status change from the solid state to the liquid state of the ink, or the ink which is solidified when it is left unused to prevent the evaporation of the ink may be used. The ink may be liquidified by the application of the thermal energy in accordance with the recording signal and may be discharged as liquid ink, or it may start to be solidified when it arrives on the recording medium and become fully solidified by thermal energy. In this case, the ink may be held in porous sheet recesses or through holes in liquid or solid state and arrange to face the electrothermal transducer, as disclosed in Japanese Laid-Open Patent Application No. 54-56847 or Japanese Laid-Open Patent Application No. 60-71260. In the present invention, the execution of the film boiling system is most effective to the inks described above.

In addition, the recording apparatus of the present invention may be an image output terminal of an information processing apparatus such as a word processor and a computer, whether it is integral or separate, or a copying machine combined with a reader, or a facsimile machine having a transmission and reception function.

What is claimed is:

1. A recording apparatus comprising:

a recording head having a plurality of recording elements, for recording an image on a recording medium;

scan means for causing said recording head to perform a recording scan, wherein said recording head records an image having a width corresponding to said plurality of recording elements by performing one recording scan;

a battery for supplying power to said recording head, an output voltage of said battery decreasing dependent upon consumption;

detection means for detecting the output voltage of said battery; and control means for changing a quantity of data to be recorded in one recording scan in accordance with the output voltage of the battery detected by said detection means, wherein said control means reduces a number of recording elements to be used in one recording scan when the output voltage of said battery decreases below a predetermined value.

2. A recording apparatus according to claim 1, wherein said control means reduces the quantity of data to be recorded in one recording scan as the output voltage of the battery decreases.

3. A recording apparatus according to claim 1, further comprising alarm means for effecting an alarm regarding a reduction of the output voltage of the battery in accordance with the output of said detection means.

4. A recording apparatus according to any of claims 1, 2 or 3, wherein said recording elements discharge ink droplets by causing a state change in ink.

5. A recording apparatus according to claim 4, wherein said recording elements generate thermal energy to cause film boiling in the ink to discharge the ink droplets.

* * * * *